US008855411B2

(12) United States Patent
He et al.

(10) Patent No.: US 8,855,411 B2
(45) Date of Patent: Oct. 7, 2014

(54) OPACITY MEASUREMENT USING A GLOBAL PIXEL SET

(75) Inventors: Kaiming He, Beijing (CN); Jian Sun, Beijing (CN); Carsten Curt Eckard Rother, Cambridge (GB); Xiao-Ou Tang, Hong Kong (CN)

(73) Assignee: Microsoft Corporation, Redmond, WA (US)

( * ) Notice: Subject to any disclaimer, the term of this patent is extended or adjusted under 35 U.S.C. 154(b) by 359 days.

(21) Appl. No.: 13/108,945

(22) Filed: May 16, 2011

(65) Prior Publication Data

US 2012/0294519 A1 Nov. 22, 2012

(51) Int. Cl.
G06K 9/34 (2006.01)
G06T 7/00 (2006.01)
G06T 7/40 (2006.01)

(52) U.S. Cl.
CPC ............. *G06K 9/34* (2013.01); *G06T 7/0081* (2013.01); *G06T 2207/10024* (2013.01); *G06T 2207/20144* (2013.01); *G06T 7/408* (2013.01)
USPC ............ 382/164; 382/171; 382/173; 382/100

(58) Field of Classification Search
USPC ......... 382/164, 199, 284, 173, 225, 218, 154, 382/100, 254, 275, 277, 171; 345/629–641
See application file for complete search history.

(56) References Cited

U.S. PATENT DOCUMENTS

| | | | |
|---|---|---|---|
| 6,134,346 A | 10/2000 | Berman et al. | |
| 7,430,339 B2 * | 9/2008 | Rother et al. | 382/284 |
| 7,636,128 B2 | 12/2009 | Sun et al. | |
| 7,660,463 B2 * | 2/2010 | Blake et al. | 382/173 |
| 7,692,664 B2 * | 4/2010 | Weiss et al. | 345/592 |
| 7,808,532 B2 | 10/2010 | Sun et al. | |
| 8,264,500 B2 * | 9/2012 | Wilensky | 345/592 |
| 2005/0271273 A1 * | 12/2005 | Blake et al. | 382/173 |
| 2006/0029275 A1 * | 2/2006 | Li et al. | 382/173 |
| 2006/0039611 A1 * | 2/2006 | Rother et al. | 382/199 |
| 2006/0210159 A1 | 9/2006 | Huang et al. | |
| 2010/0254598 A1 | 10/2010 | Yang et al. | |
| 2013/0013578 A1 * | 1/2013 | Yang et al. | 707/706 |

OTHER PUBLICATIONS

Bai et al, "A Geodesic Framework for Fast Interactive Image and Video Segmentation and Matting," IEEE ICCV 2007 (International Conference on Computer Vision), Rio De Janeiro, Brazil, Oct. 14-20, 2007, 8 pgs.
Barnes et al, "PatchMatch: A Randomized Correspondence Algorithm for Structural Image Editing," ACM Transactions on Graphics, SIGGRAPH, Aug. 2009, 10 pgs.
Barnes et al, "The Generalized PatchMatch Correspondence Algorithm," ECCV, Sep. 2010, pp. 1-14.
Chuang et al, "A Bayesian Approach to Digital Matting," CVPR, Dec. 8-14, 2001, pp. II-264-II-271.

(Continued)

*Primary Examiner* — Mekonen Bekele
(74) *Attorney, Agent, or Firm* — Carole Boelitz; Micky Minhas; Lee & Hayes PLLC

(57) ABSTRACT

A computing device is described herein that is configured to select a pixel pair including a foreground pixel of an image and a background pixel of the image from a global set of pixels based at least on spatial distances from an unknown pixel and color distances from the unknown pixel. The computing device is further configured to determine an opacity measure for the unknown pixel based at least on the selected pixel pair.

20 Claims, 4 Drawing Sheets

(56) References Cited

OTHER PUBLICATIONS

Crabb et al, "Real-time Foreground Segmentation via Range and Color Imaging," Computer Vision and Pattern Recognition Workshops, CVPRW '08, IEEE Computer Society Conference, Jun. 23-28, 2008, 5 pgs.

Gastal et al, "Shared Sampling for Real-time Alpha Matting," Eurogrphics 2010, vol. 29, No. 2, May 2010, 10 pgs.

Grady et al, "Random Walks for Interactive Alpha-matting," VIIP, Sep. 2005, 7 pgs.

Gu et al, "Quick Matting: A Matting Method Based on Pixel Spread and Propagation," Proceedings of 2010 IEEE 17th International Conference on Image Processing, Hong Kong, Sep. 26-29, 2010, pp. 4661-4664.

He et al, "Fast Matting Using Large Kernel Matting Laplacian Matrices," CVPR, Jun. 13-18, 2010, 8 pgs.

He et al, "Guided Image Filtering," ECCV, Sep. 2010, pp. 1-14.

Levin et al, "A Closed-Form Solution to Natural Image Matting," IEEE Transactions on Pattern Analysis and Machine Intelligence, vol. 30, No. 2, Feb. 2008, pp. 226-242.

Rhemann et al, "A Perceptually Motivated Online Benchmark for Image Matting," CVPR, Jun. 20-25, 2009, 8 pgs.

Rhemann et al, "Alpha Matting Evaluation Website," retrieved at <<http://www.alphamatting.com>> on Jan. 5, 2011, 1 pg.

Rhemann et al, "Improving Color Modeling for Alpha Matting," BMVC, Sep. 1-4, 2008, 10 pgs.

Rother et al, "'Grabcut'—Interactive Foreground Extraction using Iterated Graph Cuts," SIGGRAPH, Aug. 8-12, 2004, pp. 309-314.

Ruzon et al, "Alpha Estimation in Natural Images," CVPR, Jun. 13-15, 2000, 8 pgs.

Singaraju et al, "New Appearance Models for Natural Image Matting," CVPR, Jun. 20-25, 2009, 8 pgs.

Sun et al, "Poisson Matting," SIGGRAPH, SIGGRAPH, Aug. 8-12, 2004, 7 pgs.

Wang et al, "An Iterative Optimization Approach for Unified Image Segmentation and Matting," Proceedings of the Tenth IEEE International Conference on Computer Vision (ICCV'05), Oct. 17-21, 2005, 8 pgs.

Wang et al, "Image and Video Matting: A Survey," Foundations and Trends in Computer Graphics and Vision, vol. 3, No. 2, Jan. 2007, pp. 1-78.

Wang et al, "Optimized Color Sampling for Robust Matting," CVPR, Jun. 17-22, 2007, 8 pgs.

\* cited by examiner

OPACITY MEASUREMENT USING A GLOBAL PIXEL SET

BACKGROUND

In computer graphics, it is often important to extract objects shown in the foreground of an image from the background of that image. The extraction of these objects is known as alpha matting. Alpha matting takes as its input a trimap image representing foreground, background, and unknown regions. Pixels of the unknown regions may be partially transparent, blending the foreground and the background, or may belong entirely to one of the foreground or background. The output of alpha matting is the alpha matte of each pixel, the alpha matte being a measure of the opacity of the pixel with respect to the foreground. These alpha mattes are stored in the alpha channel for each pixel and have values between 0 and 1. Background pixels may be assigned a value of 0, foreground pixels a value of 1, and unknown pixels may have values of 0, 1, or values in between depending on their degree of opacity with respect to the foreground.

Existing alpha matting techniques include propagation-based alpha matting and sample-based alpha matting. Propagation-based techniques treat the problem as interpolating the unknown alpha matte values from the known regions. The interpolation can be done by solving an affinity matrix, by optimizing Markov Random Fields, or by computing geodesic distances. These techniques mainly rely on the image's continuity to estimate the alpha matte, and do not explicitly account for the foreground and background colors. They have shown success in many cases, but may fail when the foreground has long and thin structures or holes. Their performance can be improved when combined with sampling-based techniques.

Sample-based techniques first estimate the foreground and background colors and then compute the alpha mattes. Some sample-based techniques attempt to fit a parametric model to the color distributions, but these techniques are less valid when the image does not satisfy the model. Other sample-based techniques are non-parametric: they pick out some color samples from the known regions to estimate the unknown alpha matte values. These techniques perform well when the pixels in the sample set include foreground and background colors. However, the foreground and background colors are not always covered, because these sample-based techniques only collect samples near each unknown pixel, limiting the number of sample pixels and their colors.

SUMMARY

Opacity measures, such as alpha mattes, may be determined for unknown pixels of an image based on pixel pairs selected from a global set of pixels. This global set of pixels may include pixels near a boundary between a region of unknown pixels of the image and a foreground of that image as well as pixels near a boundary between the region of unknown pixels and a background of that image. The pixel pair for each unknown pixel may include a foreground pixel and a background pixel and may be selected based on color distances and spatial distances of candidate pixel pairs from the unknown pixel. In some embodiments, to reduce the computational complexity of the pixel pair selections, a correspondence search may be performed in a search space defined based on the global set of pixels. The correspondence search may include at least one of a propagation operation and a random search operation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are techniques for determining opacity measurements, such as alpha mattes, for unknown pixels of an image based on pixel pairs selected from a global set of pixels. These opacity measurements indicate degrees of opacity of the unknown pixels with respect to a foreground of the image. Such an image may be a trimap image and may include the foreground as well as a background and a region of unknown pixels. The pixel pairs each include a foreground pixel and a background pixel. The global set of pixels may include first pixels near a first boundary between the foreground and the region of unknown pixels and second pixels near a second boundary between the background and the region of unknown pixels. In some embodiments, the pixel pair for each unknown pixel is selected based on color distances and spatial distances of candidate pixel pairs from that unknown pixel. The spatial distances and color distances may be used to calculate costs for pixel pairs with respect to the unknown pixel, and the pixel pair with the minimum cost may be selected.

In various embodiments, selecting the pixel pair may involve performing a correspondence search in a search space defined based on the global set of pixels, the correspondence search including at least one of a propagation operation or a random search operation. In some embodiments, the correspondence search may involve one or more iterations of the propagation operation followed by the random search operation. In a propagation operation, the cost of a pixel pair currently assigned to an unknown pixel is compared to the cost of a pixel pair assigned to a neighboring pixel. The pixel pair with the lowest cost is selected and the currently assigned pixel is updated accordingly. In a random search operation, a pixel pair is randomly selected from the search space and its cost is compared to the cost of the pixel pair currently assigned to the unknown pixel. The pixel pair with the lowest cost is selected and the currently assigned pixel is updated accordingly. Upon completion of the iterations, the currently assigned pixel pair is selected as the pixel pair for the unknown pixel.

Example Environment

Figure 1:
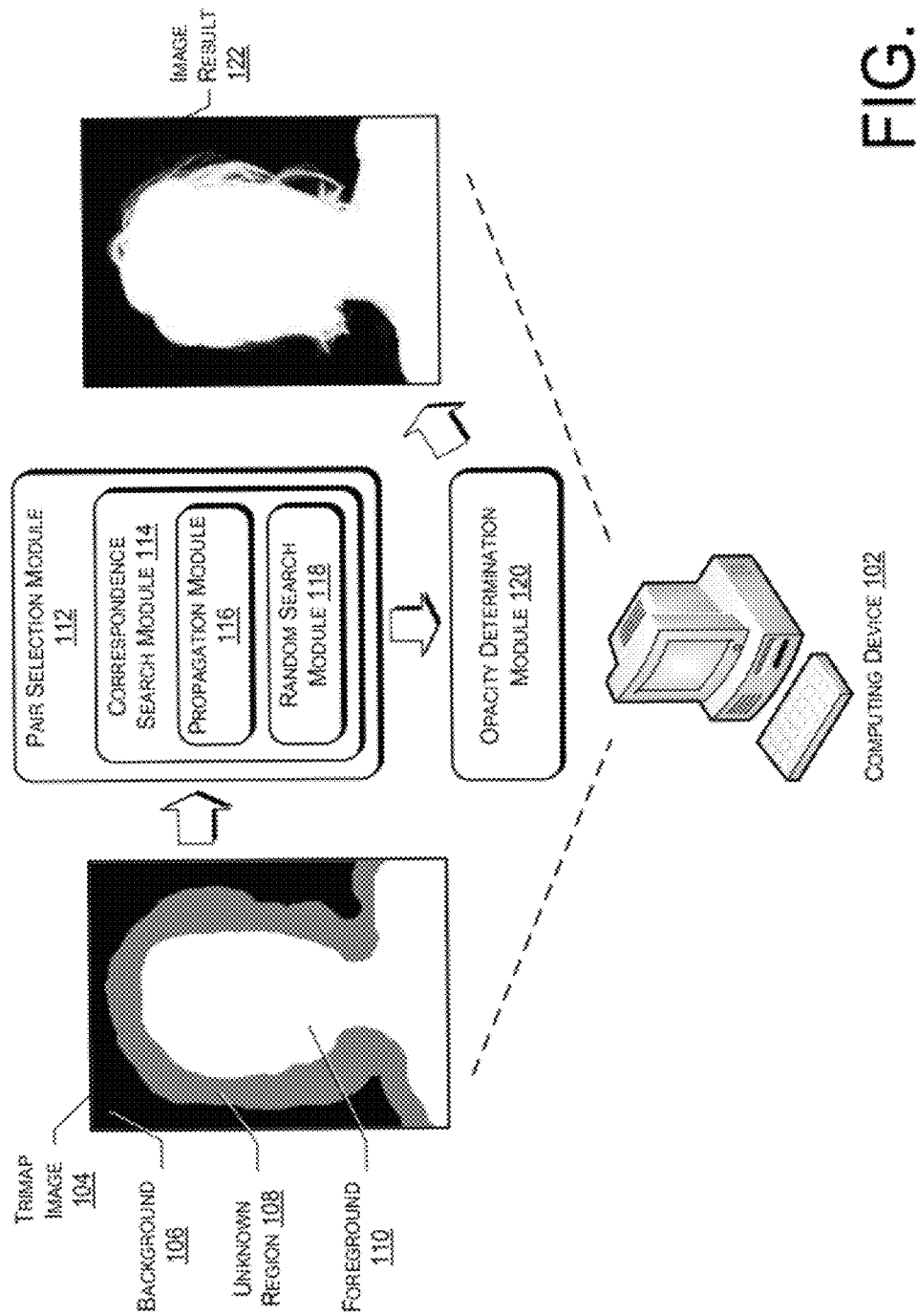
FIG. 1 illustrates an example environment to perform opacity measurement using a global pixel set, in accordance with various embodiments.

FIG. 1 illustrates an example environment, in accordance with various embodiments. As shown in FIG. 1, a computing device 102 may receive or generate a trimap image 104 that includes a background 106, an unknown region 108, and a foreground 110. Upon receiving or generating the trimap image 104, a pair selection module 112 of the computing device 102 may select a pixel pair for each unknown pixel of the unknown region 108 for use in determining opacity measures for the unknown pixels. The pair selection module 112 may include a correspondence search module 114, which may in turn include a propagation module 116 and a random search module 118 for selecting the pixel pairs. Upon selecting the pixel pairs, an opacity determination module 120 of the computing device 102 may determine opacity measures for the unknown pixels based on the selected pixel pairs. These opacity measures may be used to produce the image result 122, which may be used for layer separation, background replacement, or foreground toning.

Figure 2:
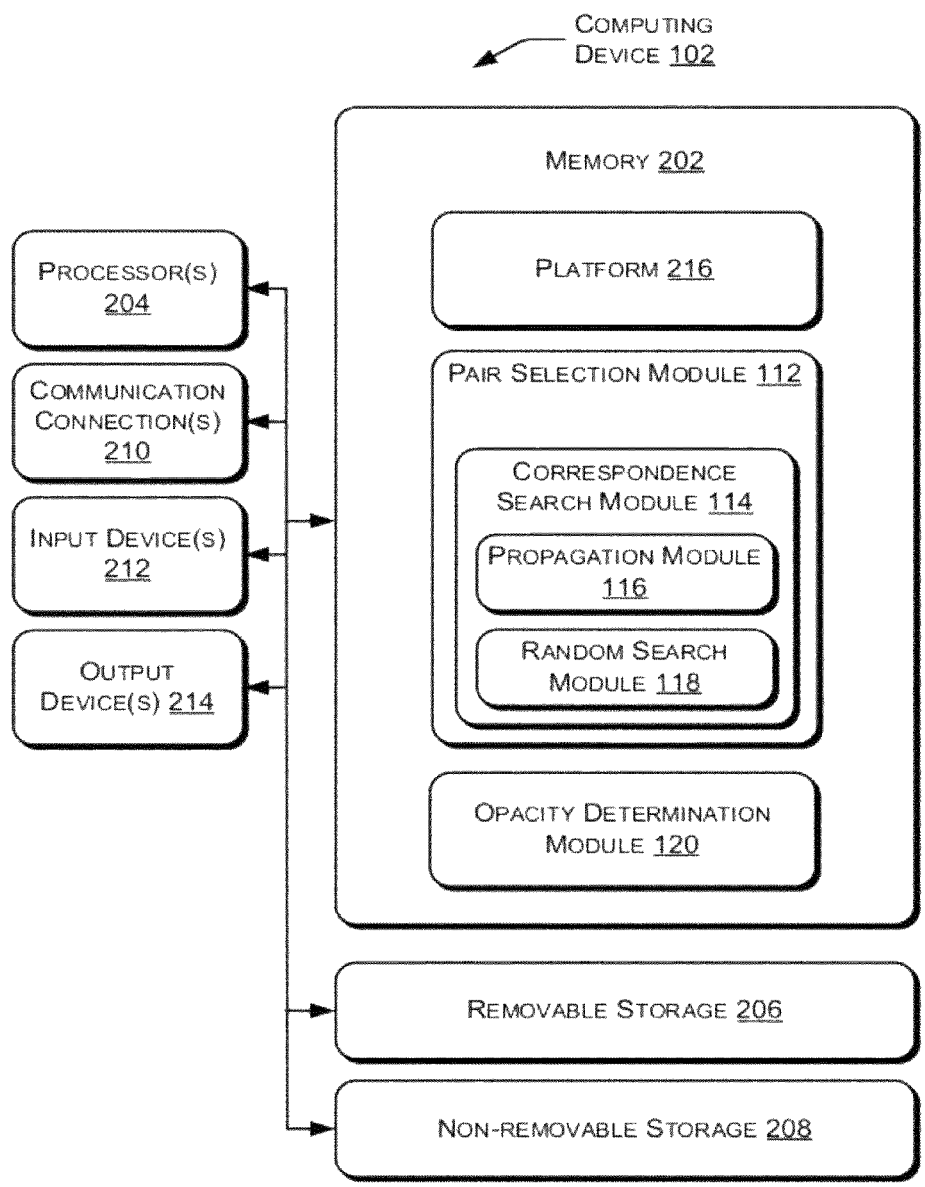
FIG. 2 is a block diagram of an example computer system architecture to perform opacity measurement using a global pixel set, in accordance with various embodiments.

In various embodiments, the computing device 102 may be any sort of computing device or computing devices. For example, the computing device 102 may be or include a personal computer (PC), a laptop computer, a server or server farm, a mainframe, a tablet computer, a work station, a telecommunication device, a personal digital assistant (PDA), a media player, a media center device, a personal video recorder (PVR), a television, or any other sort of device or devices. In one implementation, the computing device 102 represents a plurality of computing devices working in communication, such as a cloud computing network of nodes. When implemented on multiple computing devices, the computing device 102 may distribute the modules 112-120 among the multiple devices. In some implementations, the computing device 102 represents one or more virtual machines implemented on one or more computing devices. The nature and functions of the modules 112-120 are described further herein. An example computing device 102 is illustrated in FIG. 2 and is described below in greater detail with reference to that figure.

In some implementations, a network or networks may connect multiple devices represented by the computing device 102, as mentioned above. Also, such a network or networks may connect the computing device 102 to other devices, such as devices providing trimap images 104. The network or networks may be any one or more networks, such as wide area networks (WANs), local area networks (LANs), or the Internet. Also, the network or networks may be public, private, or include both public and private networks. Further, the network or networks may be wired, wireless, or include both wired and wireless networks. The network or networks may utilize any one or more protocols for communication, such as the Internet Protocol (IP), other packet based protocols, or other protocols. Additionally, the network or networks may comprise any number of intermediary devices, such as routers, base stations, access points, firewalls, or gateway devices.

As illustrated in FIG. 1 and mentioned above, the computing device 102 may receive or generate one or more trimap images 104. The trimap images 104 may be generated based on any sort of source images, such as two-dimensional or three-dimensional images, red-green-blue (RGB) images or gray-scale images. Such source images may also be of varying shapes and sizes, ranging, for example, from small thumbnails to very large, detailed home screen images. Further, such source images may include images of any of a number of formats, such as the Windows® bitmap (BMP), the graphic interchange format (GIF), the joint photographic experts groups (JPEG) format, the tagged image file format (TIFF), other Raster formats, vector formats, or stereo formats. Also, source images may include still images captured, for example, by a camera or image frames from one or more videos.

In some embodiments, the computing device 102 may generate the trimap image 104 based on user input indicating areas in the source image as foreground or background or based on an analysis of the image that identifies foreground and background areas. A number of techniques for generating trimap images are known and any such technique or another technique may be used in generating the trimap image 104.

As shown in FIG. 1, the trimap image 104 may include a background region ("the background 106"), a region of unknown pixels ("the unknown region 108"), and a foreground region ("the foreground 110"). While only a single foreground 110 and a single unknown region 108 are shown, it is to be understood that multiple separate objects may comprise foreground 110 and these objects may be separated from each other by the background 106. In such embodiments, there may also be multiple unknown regions 108 separating the multiple foregrounds 110 from the background 106.

In some embodiments, upon receiving or generating the trimap image 104, the computing device 102 may assign opacity measures, such as alpha mattes, to the foreground pixels of the foreground 110 and the background pixels of the background 106. The computing device 102 may assign foreground pixels opacity measures of "1" and background pixels opacity measures of "0." In other embodiments, the assigning of opacity measures to foreground and background pixels may be performed at a later time, such as during or after determining opacity measures for unknown pixels of the unknown region 108.

Also, upon receiving or generating the trimap image 104, the computing device 102 may generate a global set of pixels to be used by modules 112-120 in determining opacity measures for the unknown pixels. In some embodiments, computing device 102 may determine the boundaries between the background 106 and the unknown region 108 and between the unknown region 108 and the foreground 110 and select pixels that are on those boundaries, adjacent to the boundaries, or within some predetermined spatial distance of the boundaries. Such pixels may be referred to as pixels that are "near" the boundaries. In other embodiments, other pixels of the trimap image 104 may be used by the computing device 102 in constituting the global set of pixels.

In various embodiments, after the computing device 102 generates the global set of pixels, modules 112-120 of the computing device 102 may determine opacity measures for each unknown pixel. The modules 112-120 may process the unknown pixels in parallel or may process the unknown pixels serially, one after another. The following description of the operations of modules 112-120 is made with reference to a single unknown pixel, but it is to be understood that modules 112-120 may process each unknown pixel.

In some embodiments, the pair selection module 112 may select a pixel pair for the unknown pixel that includes a foreground pixel and a background pixel. The pair selection module 112 may select the pixel pair from the global pixel set based at least on color distances and spatial distances of candidate pixel pairs from the unknown pixel pair. The pair selection module 112 may use the color distance and spatial distances for a candidate pixel pair to calculate a cost for that candidate pixel pair with respect to the unknown pixel. In one embodiment, the pair selection module 112 may calculate these costs for each possible combination of foreground pixel and background pixel from the global pixel set and select the pixel pair with the lowest cost. In other embodiments, to reduce computational complexity, a correspondence search module 114 of the pair selection module 112 may perform a correspondence search of a search space defined by pixels from the global set of pixels in order to select a pixel pair.

To calculate the cost for each candidate pixel pair from the unknown pixel, the pair selection module 112 may first calculate a color cost corresponding to the color distance of the candidate pixel pair from the unknown pixel. The color cost may be defined as:

$$\epsilon_c(F^i, B^j) = \|I - (\hat{\alpha}F^i + (1-\hat{\alpha})B^j)\|$$

wherein $\epsilon_c(F^i, B^j)$ is the color cost for candidate pixel pair $F^i$, $B^j$, of which $F^i$ is the foreground pixel and $B^j$ is the background pixel. Also, I is the unknown pixel and $\hat{\alpha}$ is the opacity measure. The opacity measure α may be estimated for the candidate pixel pair by the opacity determination module 120, in the manner described further herein. This color cost represents the color distance in RGB space between the unknown pixel and the color line spanned by the candidate pixel pair.

The pair selection module 112 may then calculate a spatial cost corresponding to the spatial distance between the foreground pixel of the candidate pixel pair and the unknown pixel. That spatial cost may be defined as:

$$\varepsilon_S(F^i) = \frac{\|x_{F^i} - x_I\|}{D_F}$$

wherein $\epsilon_s(F^i)$ is the spatial cost, $x_{F^i}$ represents the spatial coordinates of the foreground pixel of the candidate pixel pair, $x_I$ represents the spatial coordinates of the unknown pixel, and $D_F$ is the minimum distance of the unknown pixel to the boundary between the foreground 110 and the unknown region 108.

Next, the pair selection module 112 may then calculate a spatial cost corresponding to the spatial distance between the background pixel of the candidate pixel pair and the unknown pixel. That spatial cost may be defined as:

$$\varepsilon_S(B^j) = \frac{\|x_{B^j} - x_I\|}{D_B}$$

wherein $\epsilon_s(B^j)$ is the spatial cost, $x_{B^j}$ represents the spatial coordinates of the background pixel of the candidate pixel pair, $x_I$ represents the spatial coordinates of the unknown pixel, and $D_B$ is the minimum distance of the unknown pixel to the boundary between the background 106 and the unknown region 108.

Using these color and spatial costs, the pair selection module 112 may calculate a cost for the candidate pixel pair. That cost may be defined as:

$$\epsilon(F^i, B^j) = \omega\epsilon_c(F^i, B^j) + \epsilon_s(F^i) + \epsilon_s(B^j)$$

wherein $\epsilon(F^i, B^j)$ is the cost for the candidate pixel pair and $\omega$ is a weighting factor used to balance color fitness and spatial distance. In one embodiment, $\omega$ may be set to "1." As mentioned above, $\epsilon_c(F^i, B^j)$ is the color cost, and $\epsilon_s(F^i)$ and $\epsilon_s(B^j)$ are the spatial costs. The pair selection module 112 may calculate these costs $\epsilon(F^i, B^j)$ for each possible candidate pixel pair and select the candidate pixel pair with the lowest cost. Alternatively, the correspondence search module 114 of the pair selection module 112 may select a subset of possible candidate pixel pairs to calculate costs for and may select the candidate pixel pair in the subset that has the lowest cost.

In various embodiments, the correspondence search module 114 may first generate the search space as two ordered pixel sets. The correspondence search module 114 may constitute the one set of pixels from foreground pixels of the global set of pixels and may constitute the other set of pixels from background pixels of the global set of pixels. The correspondence search module 114 may then order the pixels in each set by some criteria, such as color/intensity or spatial coordinates. These two ordered sets may span a two-dimensional search space in which points i,j represent candidate pixel pairs $F^i$, $B^j$.

After generating the search space, the correspondence search module 114 may assign an initial candidate pixel pair $F^i$, $B^j$ to the unknown pixel I(x,y). The currently assigned candidate pixel pair may be represented as $\Phi(x, y)$. In one embodiment, the initially assigned pixel pair may be selected at random from the search space. Upon assigning the initial pixel pair, the correspondence search module 114 may calculate the cost $\epsilon(F^i, B^j)$ of the initial pixel pair in the manner described above.

The correspondence search module 114 may then perform a number of iterations. Each iteration may include a propagation operation performed by the propagation module 116 and a random search operation performed by the random search module 118. At the completion of the number of iterations, the currently assigned pixel pair $\Phi(x, y)$ may be selected as the pixel pair for the unknown pixel. In one embodiment, the correspondence search module 114 may perform several iterations (e.g., ten iterations).

In various embodiments, to perform a propagation operation, the correspondence search module 114 may invoke the propagation module 116. The propagation module 116 may then select a pixel x',y' that is a neighbor to the unknown pixel and determine the cost $\epsilon(F^i, B^j)$ of the pixel pair currently assigned to the neighboring pixel. The propagation module 116 may then select the pixel pair with the lowest cost—either the currently assigned pixel pair or the pixel pair of the neighboring pixel—and update the currently assigned pixel pair accordingly.

In some embodiments, to perform a random search operation, the correspondence search module 114 may invoke the random search module 118. The random search module 118 may randomly select another pixel pair $(i_k, j_k)$ from the search space based on the following formula:

$$(i_k, j_k) = (i,j) + \omega\beta^k R_k$$

wherein (i,j) is the currently assigned pixel pair, k is the current iteration of the correspondence search, ω is the size of the search space, β is a ratio that is set to 0.5, and $R_k$ is a uniform random number in $[-1, 1]\times[-1, 1]$. The random search module 118 may then calculate the cost $\epsilon(F^i, B^j)$ of the randomly selected pixel pair $(i_k, j_k)$, select the pixel pair with the lowest cost—either the currently assigned pixel pair or the randomly selected pixel pair—and update the currently assigned pixel pair accordingly.

In various embodiments, once the pair selection module 112 has selected the pixel pair, the opacity determination module 120 of the computing device 102 may use the selected pixel pair to determine the opacity measure of the unknown pixel. As mentioned above, the opacity measure may indicate the degree of opacity of the unknown pixel with respect to the foreground 110. The opacity measure may be a value such as 0, 1, or a value in between 0 and 1. To determine the opacity measure for the unknown pixel, the opacity determination module 120 may calculate the opacity measure using the following formula:

$$\hat{\alpha} = \frac{(I - B^j)(F^i - B^j)}{\|F^i - B^j\|^2}$$

wherein $\hat{\alpha}$ is the opacity measure of the unknown pixel, I is the unknown pixel, $F^i$ is the foreground pixel of the selected pixel pair, and $B^j$ is the background pixel of the selected pixel pair.

In some embodiments, once an opacity measure has been determined for an unknown pixel, the opacity determination module 120 or some other module of the computing device 102 may smooth the opacity measure based on neighboring pixels of the unknown pixel, the smoothing including using one or both of a Laplacian matrix or guided filter. In one embodiment, the smoothing may involve a global optimization problem in which the opacity measure $\alpha$ is the data term and the smoothness term is a matting Laplacian matrix L. In this global optimization problem, the smoothed opacity measure a is computed by:

$$\alpha = \arg\min \alpha^T L \alpha + \lambda(\alpha - \hat{\alpha})^T D(\alpha - \hat{\alpha})$$

wherein $\lambda$ is a weighting parameter and D is a diagonal matrix. The diagonal element of D is a large constant for the unknown pixel and a confidence f for a neighboring unknown pixel. The confidence f is set to equal $\exp(\epsilon_c/2\sigma^2)$, where $\epsilon_c$ is the color cost defined above and $\sigma=1.0$. The solution to the equation for $\alpha$ may be achieved by solving a linear system.

In various embodiments, after determining the opacity measures for the unknown pixels of the unknown region 108, the computing device 102 may obtain the image result 122. Image result 122 may comprise the source image with the alpha channel of each pixel of that source image set to the determined or assigned opacity measure. Such a image result 122 is shown as a gray scale image in FIG. 1, with pixels having opacity measures of 1 shown as white, pixels having opacity measures of 0 shown as black, and pixels having opacity measures between 1 and 0 having a gray colors of intensities proportioned to the magnitude of the opacity measures (e.g., a pixel with an opacity measure of 0.75 may appear almost white, and a pixel with an opacity measure of 0.25 may appear almost black). This gray scale image is provided simply to illustrate the results of the opacity determinations and need not replace the original source image and its associated pixel colors. In some embodiments, the image result 122 may be used for layer separation, background replacement, or foreground toning Example System Architecture FIG. 2 is a block diagram of an example computer system architecture for computing device 102, in accordance with various embodiments. As shown, the computing device 102 may comprise at least a memory 202 (including a cache memory) and one or more processing units (or processor(s)) 204. The processor(s) 204 may be implemented as appropriate in hardware, software, firmware, or combinations thereof. Software or firmware implementations of the processor(s) 204 may include computer-executable or machine-executable instructions written in any suitable programming language to perform the various functions described. Processor(s) 204 may also or alternatively include one or more graphic processing units (GPUs).

Memory 202 may store program instructions that are loadable and executable on the processor(s) 204, as well as data generated during the execution of these programs. Depending on the configuration and type of computing device, memory 202 may be volatile (such as random access memory (RAM)) and/or non-volatile (such as read-only memory (ROM), flash memory, etc.). The computing device or server may also include additional removable storage 206 and/or non-removable storage 208 including, but not limited to, magnetic storage, optical disks, and/or tape storage. The disk drives and their associated computer-readable media may provide non-volatile storage of computer readable instructions, data structures, program modules, and other data for the computing devices. In some implementations, the memory 202 may include multiple different types of memory, such as static random access memory (SRAM), dynamic random access memory (DRAM), or ROM.

Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, erasable programmable read-only memory (EEPROM), flash memory or other memory technology, compact disc read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The computing device 102 may also contain communications connection(s) 210 that allow the computing device 102 to communicate with a stored database, another computing device or server, user terminals, and/or other devices on a network. The computing device 102 may also include input device(s) 212, such as a keyboard, mouse, pen, voice input device, touch input device, etc., and output device(s) 214, such as a display, speakers, printer, etc.

Turning to the contents of the memory 202 in more detail, the memory 202 may include a platform 216. The platform 216 may comprise an operating system and/or one or more application programs or services. The memory 202 may also include the pair selection module 112, the correspondence search module 114, the propagation module 116, the random search module 118, and the opacity determination module 120, which may each represent any one or more modules, applications, processes, threads, or functions. The pair selection module 112, the correspondence search module 114, the propagation module 116, the random search module 118, and the opacity determination module 120 are described above in greater detail. The memory 202 may further store data associated with and used by the pair selection module 112, the correspondence search module 114, the propagation module 116, the random search module 118, and the opacity determination module 120, as well as modules for performing other operations.

Example Operations

Figure 3:
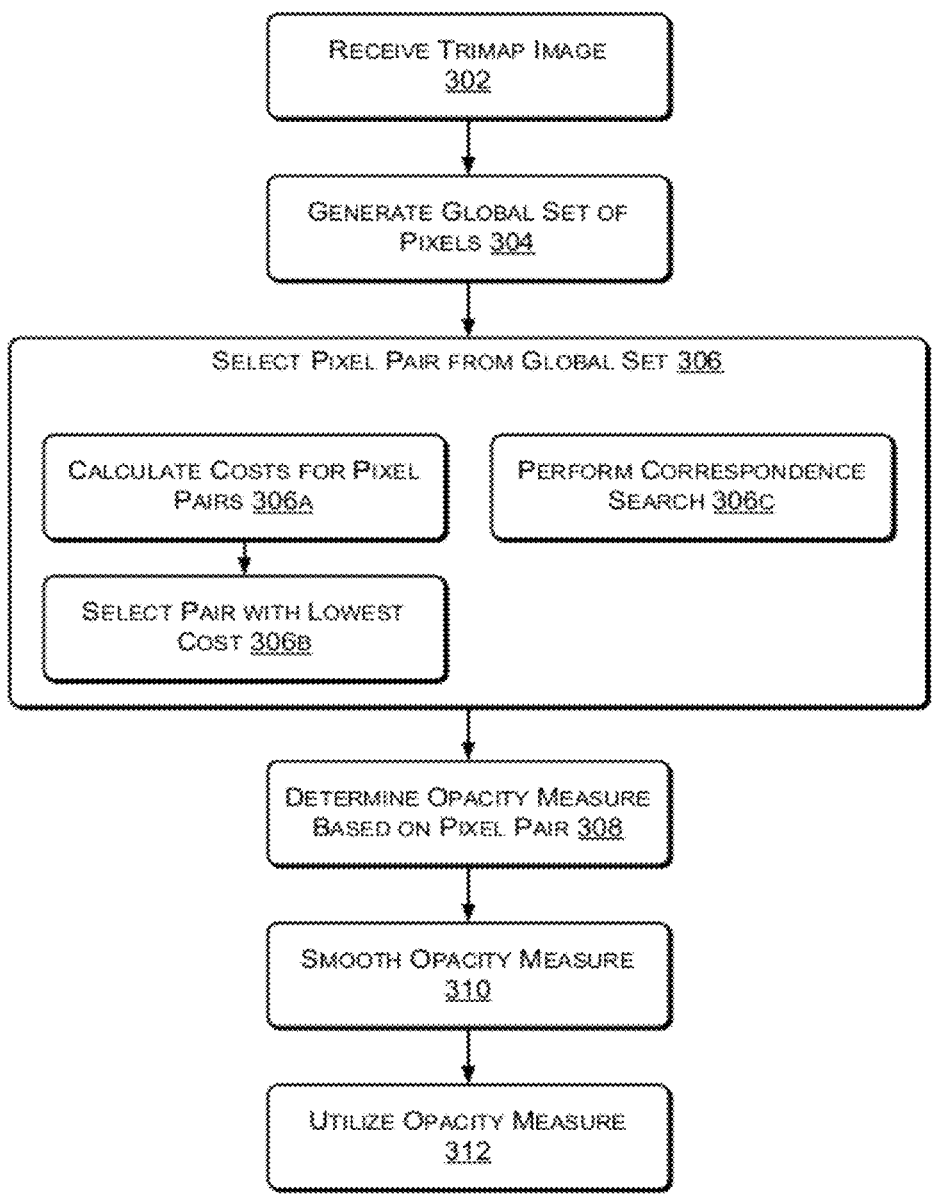
FIG. 3 is a flowchart showing an illustrative process for determining opacity measurements of unknown pixels based on pixel pairs selected from a global set of pixels, in accordance with various embodiments.
Figure 4:
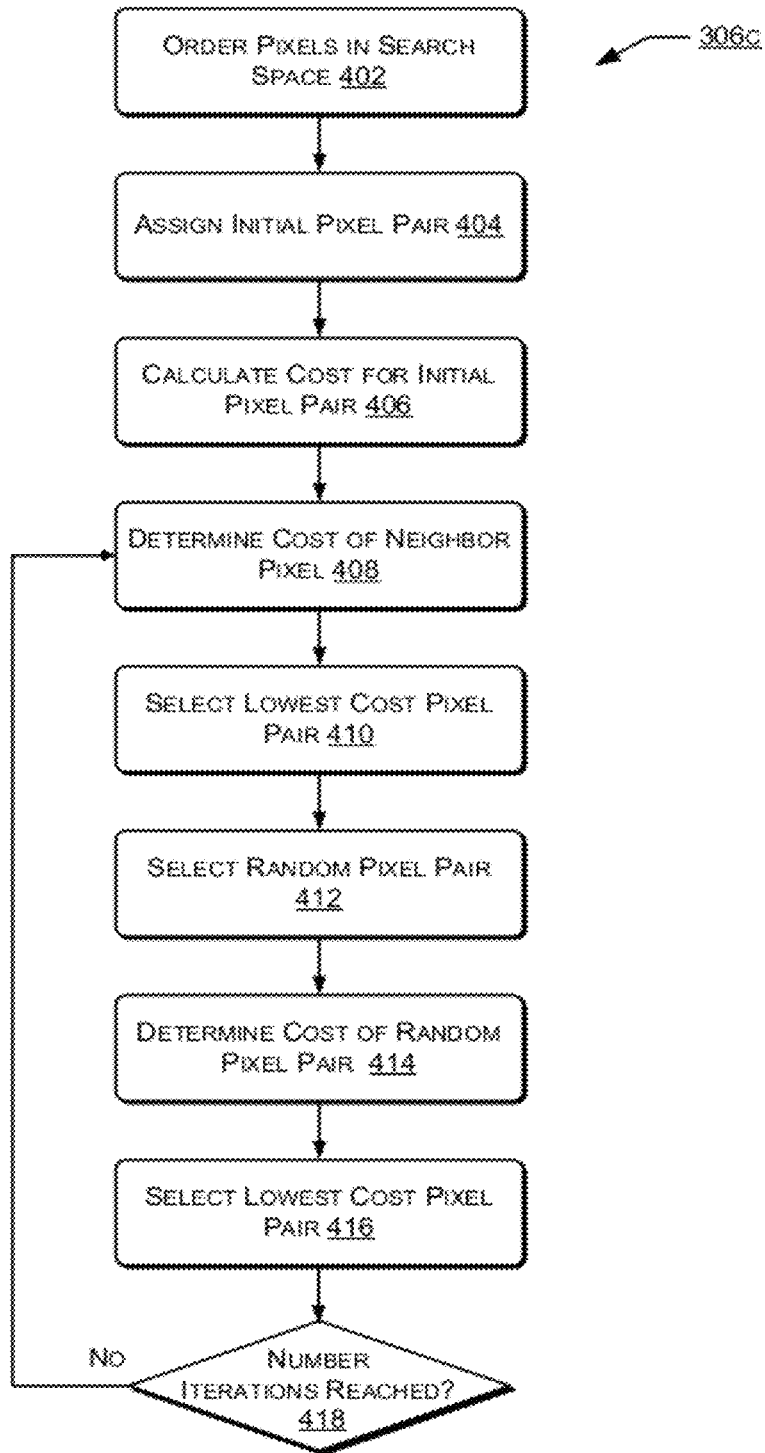
FIG. 4 is a flowchart showing an illustrative process for performing a correspondence search, in accordance with various embodiments.

FIGS. 3 and 4 are flowcharts showing operations of example processes. The operations of the processes are illustrated in individual blocks and summarized with reference to those blocks. These processes are illustrated as logical flow graphs, each operation of which may represent a set of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 3 is a flowchart showing a process for determining opacity measures of unknown pixels based on pixel pairs selected from a global set of pixels, in accordance with various embodiments. As illustrated at block 302, a computing device may receive or generate a trimap image that includes a foreground, a background, and a region of unknown pixels between the foreground and the background. The trimap image may be generated from another image based on user input or analysis indicating portions of the other image that are foreground and portions that are background.

At block 304, upon receiving or generating the trimap image, the computing device may generate a global set of pixels, the global set of pixels including first pixels near a first boundary between the foreground and the region of unknown pixels and second pixels near a second boundary between the background and the region of unknown pixels. In one embodiment, the pixels near the boundaries comprise pixels on or adjacent to the boundaries.

Upon generating the global set of pixels, the computing device may perform the operations shown at blocks 306-310 for a plurality of unknown pixels from the region of unknown pixels. Each of blocks 306-310 are described with reference to operations performed for a single unknown pixel.

At block 306, the computing device may select a pixel pair including a foreground pixel from the foreground of the trimap image and a background pixel from the background of the trimap image, the computing device selecting the pixel pair from a global set of pixels based at least on spatial distances from an unknown pixel and color distances from the unknown pixel. In one embodiment, as shown at block 306a, the computing device may calculate costs for candidate pixel pairs included in the global set of pixels, each cost being associated with a color distance of the candidate pixel pair from the unknown pixel and spatial distances of the pixel pair from the unknown pixel. At block 306b, the computing device may then select the pixel pair with the lowest cost. In another embodiment, at block 306c, the computing device may select the pixel pair by performing a correspondence search in a search space, the correspondence search including at least one of a propagation operation or a random search operation. The correspondence search of block 306c is shown in FIG. 4 and described in greater detail herein with reference to that figure.

At block 308, upon selecting the pixel pair, the computing device may determine an opacity measure for the unknown pixel based at least on the selected pixel pair. The opacity measure may indicate a degree of opacity of the unknown pixel with respect to the foreground of the trimap image. The computing device may then smooth the opacity measure, at block 310, based on neighboring pixels of the unknown pixel, the smoothing including using one or both of a Laplacian matrix or guided filter.

At block 312, the computing device may utilize the opacity measures for unknown pixels for layer separation, background replacement, or foreground toning FIG. 4 is a flowchart showing a process for performing a correspondence search, in accordance with various embodiments. As mentioned at block 306c of FIG. 3, this correspondence search may be performed to select a pixel pair.

At block 402 of FIG. 4, the computing device may first separately order the foreground pixels and the background pixels in a search space based at least on color intensities of the foreground pixels and the background pixels. These foreground and background pixels may belong to the global set of pixels.

At block 404, the computing device may then assign a pixel pair to the unknown pixel. This pixel pair may be found in the search space and may be assigned at random. At block 406, the computing device may then calculate a cost for the assigned pixel pair, the cost being associated with a color distance of the assigned pixel pair from the unknown pixel and spatial distances of the assigned pixel pair from the unknown pixel.

The computing device may then perform one or more iterations of the correspondence search, those iterations shown at blocks 408-418. Each iteration may include a propagation operation and a random search operation. The propagation operation is shown at blocks 408 and 410, and the random search operation is shown at blocks 412-416.

In performing the propagation operation at block 408, the computing device may select a neighboring pixel of the unknown pixel and determine if a pixel pair associated with the neighboring pixel has a lower cost than that of the currently assigned pixel pair. Based on that determination, at block 410, the computing device may select the pixel pair with the lowest cost and update the currently assigned pixel pair accordingly.

In performing the random search operation at block 412, the computing device may randomly select a pixel pair from a search space. At block 414, the computing device may determine the cost of the randomly selected pixel pair with respect to the unknown pixel. Upon determining the cost of the randomly selected pixel pair, the computing device may compare that cost to the cost of the currently assigned pixel pair, select, at block 416, the lowest cost pixel pair, and update the currently assigned pixel pair accordingly.

At decision block 418, the computing device may then determine if the number of iterations has been reach. If not, the computing device again repeats the operations shown at blocks 408-416. If the number of iterations has been reached, then the currently assigned pixel pair following the selecting at block 416 of the most recent iteration is selected as the pixel pair to be used in determining an opacity measure for the unknown pixel.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method comprising:
    selecting, by a computing device, a pixel pair including a foreground pixel of an image and a background pixel of the image from a global set of pixels based at least on spatial distances from an unknown pixel and color distances from the unknown pixel, wherein the spatial distances and the color distances are used to calculate costs for pixel pairs with respect to the unknown pixel, the cost for each pixel pair being the sum of a color cost and spatial costs for that pixel pair, and the selecting comprises selecting a pixel pair with a minimum cost; and determining, by the computing device, an opacity measure for the unknown pixel based at least on the selected pixel pair.

2. The method of claim 1, wherein the image is a trimap image that includes a foreground, a background, and a region of unknown pixels between the foreground and the background and the method comprises receiving the trimap image.

3. The method of claim 2, further comprising generating the global set of pixels, the global set of pixels including first pixels near a first boundary between the foreground and the region of unknown pixels and second pixels near a second boundary between the background and the region of unknown pixels.

4. The method of claim 1, wherein the cost for a pixel pair is defined as a sum of (i) a color cost of the pixel pair multiplied by a weighting factor, (ii) a spatial cost of a foreground pixel of the pixel pair, and (iii) a spatial cost of a background pixel of the pixel pair.

5. The method of claim 4, wherein the color cost represents a distance in color space between the unknown pixel and a color line spanned by the pixel pair.

6. The method of claim 4, wherein the spatial cost of the foreground pixel is defined as a product of (i) a difference between spatial coordinates of the foreground pixel and spatial coordinates of the unknown pixel divided by (ii) a minimum distance between the unknown pixel and a boundary between a region of unknown pixels and a foreground of the image.

7. The method of claim 1, wherein the selecting comprises performing a correspondence search in a search space, the correspondence search including a propagation operation.

8. The method of claim 1, further comprising smoothing the opacity measure based on neighboring pixels of the unknown pixel, the smoothing including using one or both of a Laplacian matrix or guided filter.

9. The method of claim 1, wherein the opacity measure indicates a degree of opacity of the unknown pixel with respect to a foreground of the image.

10. The method of claim 1, wherein the opacity measure is defined as:

$$\hat{\alpha} = \frac{(I - B^j)(F^i - B^j)}{\|F^i - B^j\|^2}$$

wherein $\hat{\alpha}$ is the opacity measure of the unknown pixel, I is the unknown pixel, $F^i$ is the foreground pixel of the pixel pair, and $B^j$ is the background pixel of the pixel pair.

11. One or more computer-readable storage devices storing computer-executable instructions configured to program one or more computing devices to perform operations comprising:

receiving a trimap image that includes a foreground, a background, and a region of unknown pixels between the foreground and the background;

selecting a pixel pair including a foreground pixel of the foreground and a background pixel of the background from a global set of pixels based at least on spatial distances from an unknown pixel and color distances from the unknown pixel, wherein the global set of pixels includes first pixels near a first boundary between the foreground and the region of unknown pixels and second pixels near a second boundary between the background and the region of unknown pixels, and wherein the spatial distances and the color distances are used to calculate costs for pixel pairs with respect to the unknown pixel, the cost for each pixel pair being the sum of a color cost and spatial costs for that pixel pair, and the selecting comprises selecting a pixel pair with a minimum cost; and determining an opacity measure for the unknown pixel based at least on the selected pixel pair.

12. The one or more computer-readable storage devices of claim 11, wherein the operations further include utilizing the opacity measure and opacity measures for other unknown pixels of the image for layer separation, background replacement, or foreground toning.

13. The method of claim 4, wherein the spatial cost of the background pixel is defined as a product of (i) a difference between spatial coordinates of the background pixel and spatial coordinates of the unknown pixel divided by (ii) a minimum distance between the unknown pixel and a boundary between a region of unknown pixels and a background of the image.

14. The method of claim 1, wherein the selecting comprises performing a correspondence search in a search space, the correspondence search including a random search operation.

15. The method of claim 14, wherein the random search operation comprises comparing a cost of a pixel pair currently assigned to the unknown pixel to a cost of a randomly selected pixel pair of the image and updating a currently assigned pixel pair based on the comparison.

16. A system comprising:
a processor;
a pair selection module configured to be operated by the processor to select a pixel pair including a foreground pixel of an image and a background pixel of the image from a global set of pixels based at least on spatial distances from an unknown pixel and color distances from the unknown pixel, wherein the spatial distances and the color distances are used to calculate costs for pixel pairs with respect to the unknown pixel, the cost for each pixel pair being the sum of a color cost and spatial costs for that pixel pair, and the selecting comprises selecting a pixel pair with a minimum cost; and
an opacity determination module configured to be operated by the processor to determine an opacity measure for the unknown pixel based at least on the selected pixel pair.

17. The system of claim 16, wherein the cost for a pixel pair is defined as a sum of (i) a color cost of the pixel pair multiplied by a weighting factor, (ii) a spatial cost of a foreground pixel of the pixel pair, and (iii) a spatial cost of a background pixel of the pixel pair.

18. The system of claim 17, wherein the color cost represents a distance in color space between the unknown pixel and a color line spanned by the pixel pair.

19. The system of claim 17, wherein the spatial cost of the foreground pixel is defined as a product of (i) a difference between spatial coordinates of the foreground pixel and spatial coordinates of the unknown pixel divided by (ii) a minimum distance between the unknown pixel and a boundary between a region of unknown pixels and a foreground of the image.

20. The system of claim 17, wherein the spatial cost of the background pixel is defined as a product of (i) a difference between spatial coordinates of the background pixel and spatial coordinates of the unknown pixel divided by (ii) a minimum distance between the unknown pixel and a boundary between a region of unknown pixels and a background of the image.

* * * * *